(12) United States Patent
Ohta et al.

(10) Patent No.: US 7,342,948 B2
(45) Date of Patent: Mar. 11, 2008

(54) BLOWER USED FOR LASER OSCILLATOR

(75) Inventors: Kazuya Ohta, Fujiyoshida (JP); Michinori Maeda, Gotenba (JP); Akira Egawa, Gotenba (JP)

(73) Assignee: Fanuc Ltd, Yamanashi (JP)

( * ) Notice: Subject to any disclaimer, the term of this patent is extended or adjusted under 35 U.S.C. 154(b) by 28 days.

(21) Appl. No.: 11/402,795

(22) Filed: Apr. 13, 2006

(65) Prior Publication Data

US 2006/0233212 A1    Oct. 19, 2006

(30) Foreign Application Priority Data

Apr. 14, 2005    (JP) .............................. 2005-116971

(51) Int. Cl.
*H01S 3/04* (2006.01)

(52) U.S. Cl. ............................ 372/34; 372/38; 372/55; 372/58; 372/59; 372/61

(58) Field of Classification Search .................. 372/34, 372/36
See application file for complete search history.

(56) References Cited

U.S. PATENT DOCUMENTS

| | | | |
|---|---|---|---|
| 5,111,474 A | * | 5/1992 | Funakubo et al. ............ 371/61 |
| 5,124,997 A | * | 6/1992 | Funakubo et al. ............ 372/58 |
| 5,206,873 A | * | 4/1993 | Funakubo et al. ............ 372/58 |
| 5,461,636 A |   | 10/1995 | Karube et al. |
| 5,727,011 A | * | 3/1998 | Choo et al. .................... 372/58 |
| 6,363,892 B1 |   | 4/2002 | Zobel et al. |
| 2004/0013546 A1 |   | 1/2004 | Klein et al. |

FOREIGN PATENT DOCUMENTS

| | | |
|---|---|---|
| EP | 0 291 548 A1 | 11/1988 |
| EP | 1 094 289 A2 | 4/2001 |
| JP | 1-205585 | 8/1989 |

* cited by examiner

*Primary Examiner*—Minsun Oh Harvey
*Assistant Examiner*—Yuanda Zhang
(74) *Attorney, Agent, or Firm*—Drinker Biddle & Reath LLP

(57) ABSTRACT

In an laser oscillator (100), a blower (10, 20, 120) for circulating a laser medium between an electric discharge tube (102) and a circulating passage (104) includes: a casing (12) having a suction port (12a) and an exhaust port (12b); and a blade (18) pivotally supported in the casing (12) so that the blade (18) can face the suction port (12a) and the exhaust port (12b). The blade (18) is formed into a shape in which a diameter of the blade (18) is different at a position on a cross section perpendicular to a rotary central line (O), and a gap ($G_o$) between a portion, in which a diameter of the blade (18) is relatively large, and the casing is larger than a gap ($G_i$) between a portion, in which a diameter of the blade (18) is relatively small, and the casing. Due to the foregoing, a highly reliable blower used for a laser oscillator, the reduction of the blower efficiency of which is suppressed to be as small as possible, can be provided.

3 Claims, 4 Drawing Sheets

BLOWER USED FOR LASER OSCILLATOR

BACKGROUND OF THE INVENTION

1. Field of the Invention

The present invention relates to a blower. More particularly, the present invention relates to a blower used for circulating a laser medium in a laser oscillator, in which gas is used as the laser medium, such as a chemical laser or a gas laser.

2. Description of the Related Art

A gas laser, especially a carbon dioxide gas laser is used for cutting and welding a metal material or a nonmetal material. In the case of a gas laser oscillator, a laser medium, for example, carbon dioxide gas is circulated between an electric discharge tube and a heat exchanger, which is a laser medium cooling device, so as to maintain a temperature of carbon dioxide gas at an appropriate value. In order to circulate the laser medium, a centrifugal blower, an example of which is shown in FIGS. 4a and 4b, is usually used.

In FIGS. 4a and 4b, the blower 50 of the prior art includes a blade 54, which is pivotally supported by a drive motor 56 so that the blade 54 can be freely rotated round a central axis O by the drive motor 56, wherein this blower 50 is arranged in a casing 52 in which a suction port 52a and an exhaust port 52b are defined. In order to rotate the blade 54, a space G is provided between the blade 54 and the casing 52. In the blower 50 of the prior art, a gap formed between the blade 54 and the casing 52 is constant all over the region of the space G. Accordingly, concerning the interval $G_i$ formed in a region adjacent to the suction port 52a and the interval $G_o$ formed in a region adjacent to the exhaust port 52b, while consideration is being given to the blower efficiency and reliability, the intervals $G_i$ and $G_o$ are determined at the same value and in a range from 0.1 mm to 1.0 mm.

In the blower used for a laser oscillator, in the case where the accuracy of rotation is deteriorated due to the abrasion caused in bearings 58a, 58b, the blade 54 comes into contact with the casing 52. At this time, a minute dust is generated in the casing 52 and mixed into the laser medium. When this dust contained in the laser medium attaches to a mirror, the laser output is lowered. Accordingly, it is necessary to maintain a laser medium passage clean at all times. Therefore, it is necessary to prevent the blower blade 54, which is used for circulating the laser medium, from coming into contact with the casing 52. In order to accomplish the above object, it is desirable to extend a space G formed between the blade 54 and the casing 52. However, when the space G formed between the blade 54 and the casing 52 is extended, the blower efficiency is deteriorated. On the other hand, in order to realize a high blower efficiency, it is effective to reduce the space G formed between the blade 54 and the casing 52 so as to decrease a leakage of fluid from the space. However, when the space G is reduced, there is a high possibility that the blade 54 comes into contact with the casing 52. Therefore, the reliability of the blower is lowered.

It is the technical task of the present invention to solve the above problems of the prior art. An object of the present invention is to provide a highly reliable blower used for a laser oscillator, the deterioration of the blower efficiency of which is minimized.

SUMMARY OF THE INVENTION

In the first aspect of the present invention, a blower used for a laser oscillator is provided, and the laser oscillator includes: an electric discharge tube in which a laser medium of gas is circulated; electrodes arranged at the electric discharge tube; a pair of reflecting mirrors arranged at both end portions of the electric discharge tube; a heat exchanger for cooling the laser medium in the electric discharge tube; and a circulating passage through which the laser medium is sucked from the electric discharge tube and introduced into the heat exchanger and the laser medium, which has been cooled by the heat exchanger, is returned to the electric discharge tube, wherein the blower circulates the laser medium between the electric discharge tube and the circulating passage in the laser oscillator, and the blower comprises: a casing having a suction port and an exhaust port; and a blade pivotally supported in the casing so that the blade can face the suction port and the exhaust port, wherein the blade is formed into a shape in which a diameter of the blade is different according to a position on a cross section perpendicular to a rotary center line of the blade, and a gap between the blade and the casing in a portion in which the diameter of the blade is relatively large is larger than a gap between the blade and the casing in a portion in which the diameter of the blade is relatively small.

In the second aspect of the present invention, a blower used for a laser oscillator according to the first aspect is provided, in which a gap between the casing and the blade in a portion where the diameter of the blade is a maximum is extended to be larger than a gap in a portion other than the portion where the diameter is a maximum.

In the third aspect of the present invention, a blower used for a laser oscillator according to the first aspect is provided, in which a gap between the casing and the blade in a portion where the diameter of the blade is minimum is smaller than a gap in a portion other than the portion where the diameter is minimum.

According to the present invention, a gap formed between the casing and the blade, the diameter of which is relatively large, which is greatly moved when it is rotated, is extended to be larger than a gap formed between the casing and the blade, the diameter of which is relatively small. Therefore, while a reduction of the blower efficiency is decreased to as small as possible, contact of the blade with the casing can be prevented.

Other objects and features of the present invention will be more apparent on consideration of the accompanying drawings and following explanations wherein several exemplary embodiments of the invention are disclosed.

BRIEF DESCRIPTION OF THE INVENTION

FIG. 1b is a partially enlarged sectional view showing a portion I in FIG. 1a.

FIG. 2b is a partially enlarged sectional view showing a portion II in FIG. 2a.

FIG. 4b is an enlarged sectional view of the portion shown by IV in FIG. 4a.

DETAILED DESCRIPTION

Referring to the accompanying drawings, a preferred embodiment of the present invention will be explained below.

Figure 3:
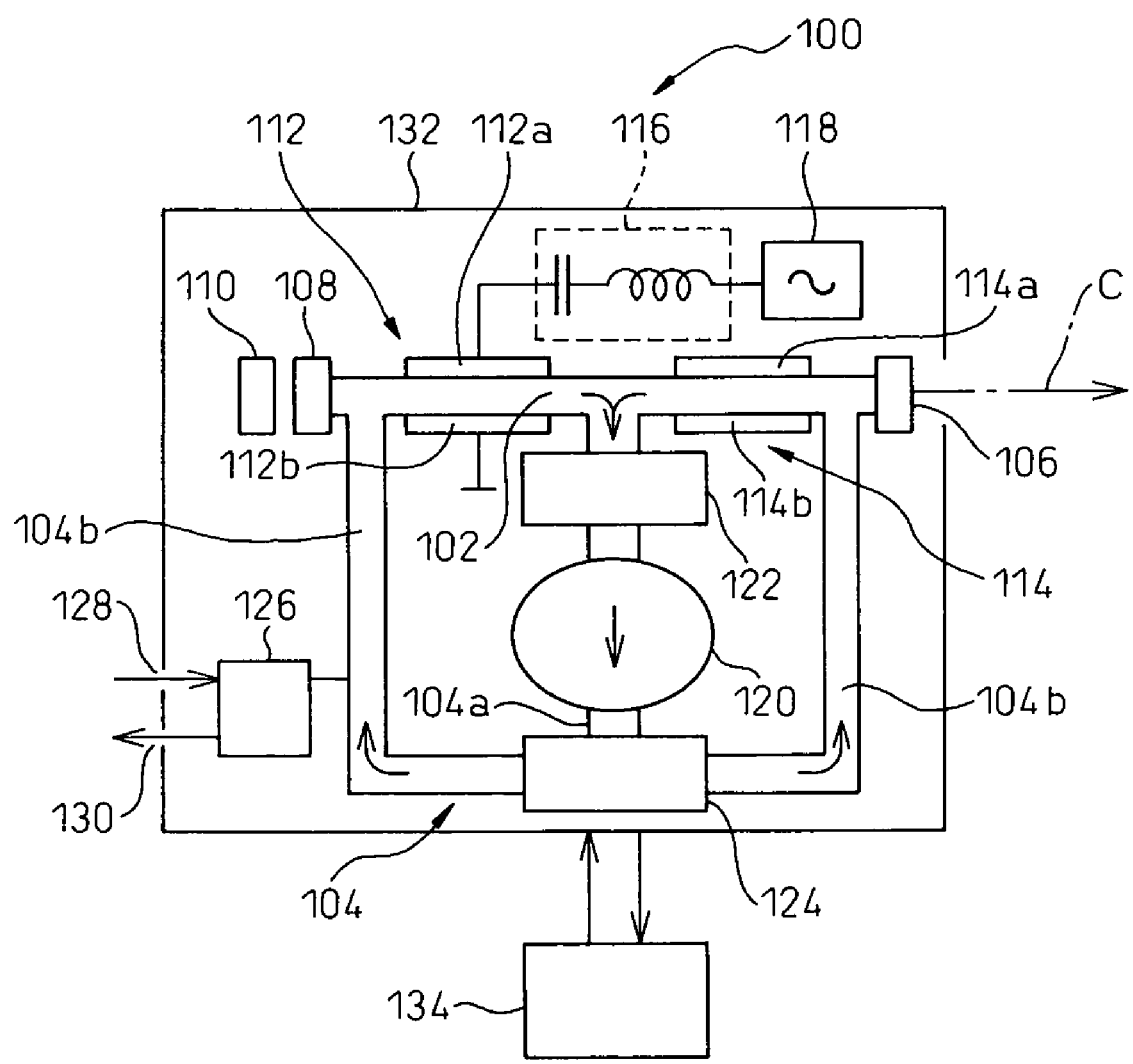
FIG. 3 is a block diagram showing an outline of the laser oscillator to which the present invention is applied.
Figure 4A:
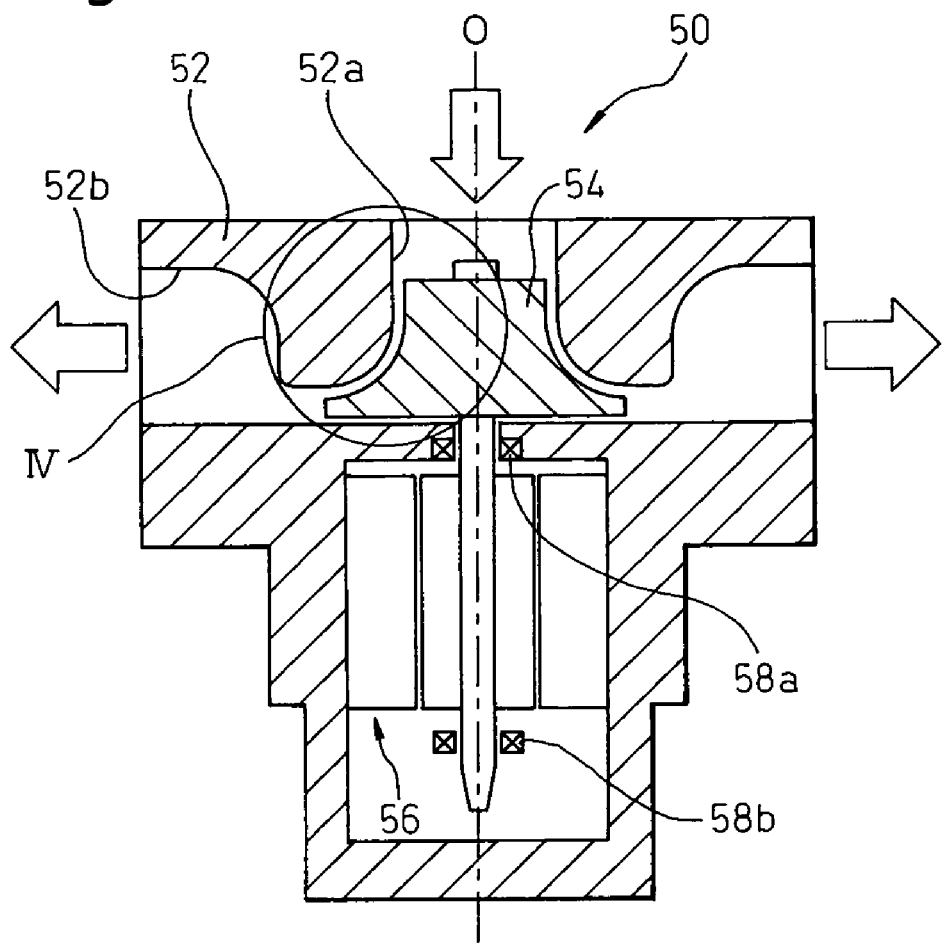
FIG. 4a is a sectional view showing an outline of the entire blower of the prior art.
Figure 4B:
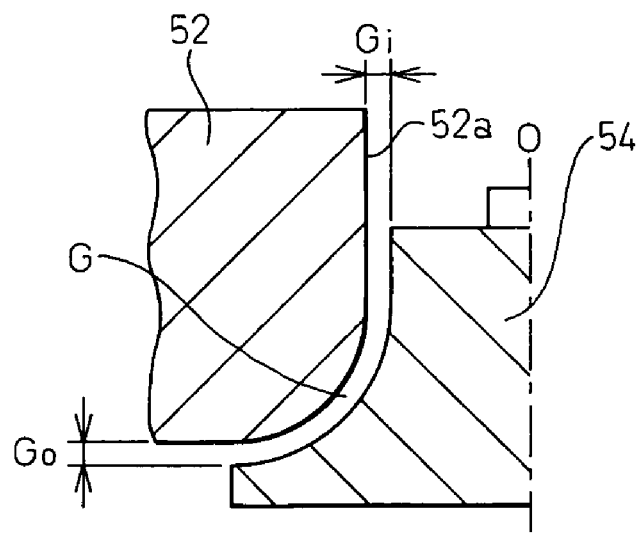

First of all, referring to FIG. 3, an example of the laser oscillator, to which the present invention is applied, is shown. This laser oscillator is a relatively high output gas laser oscillator of the induced discharge exciting type and, for example, this laser oscillator is a carbon dioxide gas laser oscillator 100. The laser oscillator 100 includes: an electric discharge tube 102; and a circulating passage 104 having a suction passage 104a for sucking a laser medium, which is gas, from a substantially central portion in the longitudinal direction of the electric discharge tube 102 and also having a return passage 104b for discharging the laser medium to portions adjacent to both end portions of the electric discharge tube 102. An output mirror 106 is attached to a forward end portion of the electric discharge tube 102, and a rear mirror 108 is attached to a rear end portion of the electric discharge tube 102. An optical resonance space is formed between the output mirror 106 and the rear mirror 108. A laser power sensor 110 is provided at the rear of the rear mirror 108. In the electric discharge tube 102, in a portion adjacent to the rear mirror 108, a first electric discharge section 112 is provided which includes a pair of electric discharge electrodes 112a, 112b, which are opposed to each other, between which the electric discharge tube 102 is interposed. The first electric discharge section 112 is connected to a laser power source 118 through a matching circuit 116. In the electric discharge tube 102, in a portion adjacent to the output mirror 106, a second electric discharge section 114 is provided which includes a pair of electric discharge electrodes 114a, 114b, which are opposed to each other, between which the electric discharge tube 102 is interposed. In this connection, although not shown in FIG. 3, in the same manner as that of the first electric discharge section 112, the second electric discharge section 114 is connected to a laser power source through a matching circuit.

In the suction passage 104a of the circulating passage 104, a blower 120 for circulating the laser medium is arranged. Further, in the suction passage 104a of the circulating passage 104, on the suction side and the discharge side of the blower 120, a first and a second heat exchanger 122, 124 are respectively arranged. A gas supply pipe 128 and a gas discharge pipe 130 are connected to the return passage 104b of the circulating passage 104 through a gas pressure control unit 126. The gas pressure control unit 126 controls supplying and discharging laser gas so that the pressure in the electric discharge tube 102 and the circulating passage 104 can be maintained at an appropriate value.

Components of the above laser oscillator 100 can be accommodated in the casing 132. The laser oscillator 100 is connected to a cooling water system 134 provided outside the casing 132. Therefore, the laser medium is appropriately cooled through the heat exchangers 122, 124 and maintained at an appropriate temperature.

Figure 1A:
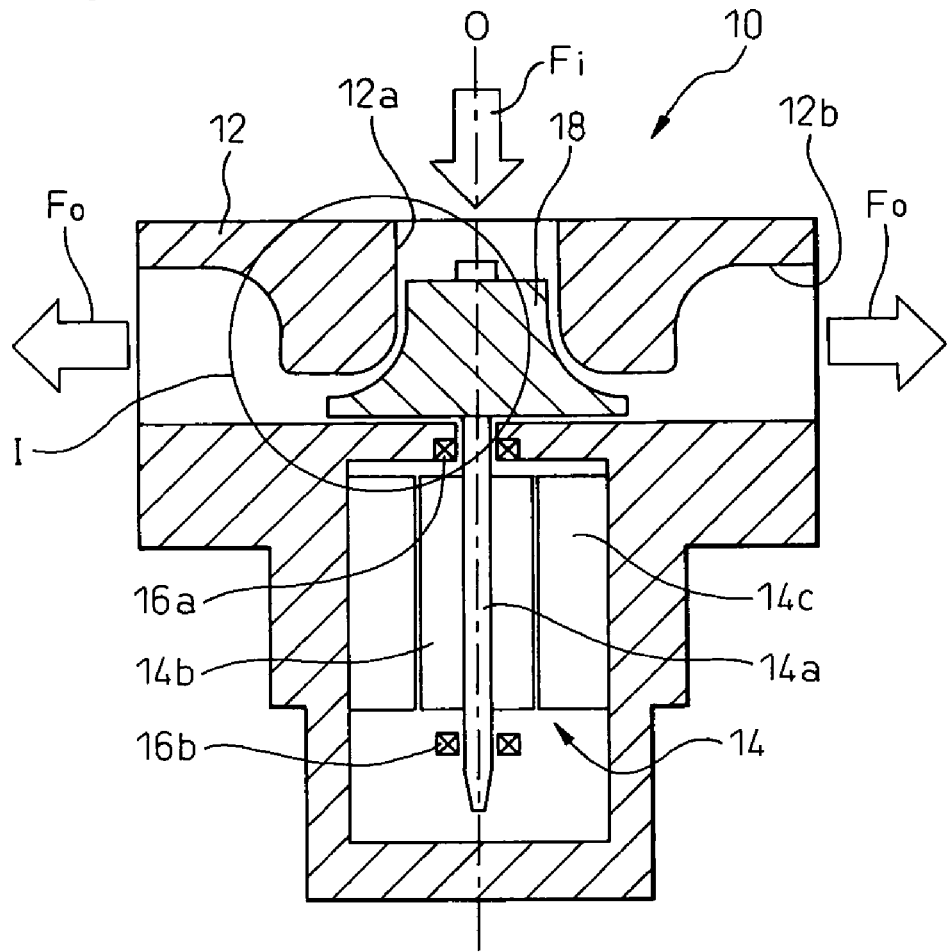
FIG. 1a is a sectional view showing an outline of the entire blower of the first embodiment of the present invention.

Next, referring to FIGS. 1a and 1b, the blower of the first embodiment of the present invention will be explained as follows. The blower 10 shown in FIG. 1a is a blower used for the laser oscillator 100, in which the blower is shown as a blower 120 in FIG. 3. The blower 10 includes: a casing 12 having a suction port 12a and an exhaust port 12b; a drive motor 14 having a rotary shaft 14a extending along the central axis O of the casing 12, having a rotor 14b fixed to the rotary shaft 14a and having a stator 14c which is opposed to the rotor 14b and fixed onto an inner face of the casing 12; and a blade 18 pivotally supported by bearings 16a, 16b, which are attached to the rotary shaft 14a, capable of rotating round the central axis O together with the rotary shaft 14a in the casing 12. In the blower 10, when the blade 18 is rotated, gas is sucked from the suction port 12a along the central axis O as shown by the arrow $F_i$, and the thus sucked gas is discharged from the exhaust port 12b in the circumferential direction as shown by the arrow $F_o$.

Figure 1B:
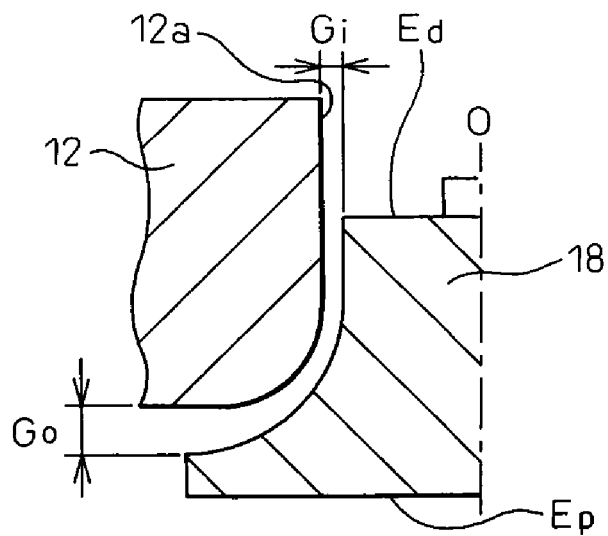

As can be understood from FIG. 1b, the blade 18 is formed into a shape in which a size of the blade 18 in a direction perpendicular to the central axis O which is the rotary central line, that is, a diameter of the blade 18 is gradually increased from the forward end side $E_d$ to the base end side $E_p$ along the central axis O. In a portion of the blade 18 in which the diameter of the blade 18 is a maximum, a gap formed between the blade 18 and the casing 12 is larger than a gap formed between the other portion of the blade 18 and the casing 12. According to the above structure, the gap $G_o$ formed between the blade 18 and the casing 12 in the neighborhood of the discharge port 12b is larger than the gap $G_i$ formed between the blade 18 and the casing 12 in the neighborhood of the suction port 12a.

In the embodiment shown in FIGS. 1a and 1b, when the casing 12 is moved upward along the central axis O, the gap $G_i$, which is in a portion where the diameter of the blade 18 is minimum, adjacent to the suction port 12a, can be maintained at a gap that is the same as that of the conventional blower, and the gap $G_o$, which is in a portion where the diameter of the blade 18 is maximum, adjacent to the discharge port 12b, can be enlarged to be larger than the conventional gap by a distance of the movement of the casing 12. The above structure can be easily realized by inserting a simple spacer without changing shapes of components such as a casing 12 and others.

Next, operation of this embodiment will be explained as follows.

When the electric discharge tube 102 is filled with a laser medium, for example carbon dioxide and electric discharge is conducted in the electric discharge sections 112, 114 while the electric discharge tube 102 is being disposed between the electric discharge electrodes of the electric discharge sections 112, 114, laser beam C is irradiated from the output mirror 106. During the irradiation of the laser beam C, when the blade 18 of the blower 10 (120) is rotated by the drive motor 14, the laser medium in the electric discharge tube 102 is sucked into the blower 10 (120) through the suction passage 104a and returned to the electric discharge tube 102 through the return passage 104b. At this time, the laser medium is cooled by the first and the second heat exchanger 122, 124.

In this embodiment, a gap formed between the casing 12 and a portion of the blade 18, the diameter of which is maximum, which swings the most due to the rotation of the blade 18, is larger than a gap formed between the casing 12 and the other portion of the blade 18. Therefore, while a reduction of the efficiency of the blower 10 is decreased to as small as possible, the blade 18 and the casing 12 can be prevented from coming into contact with each other.

Figure 2A:
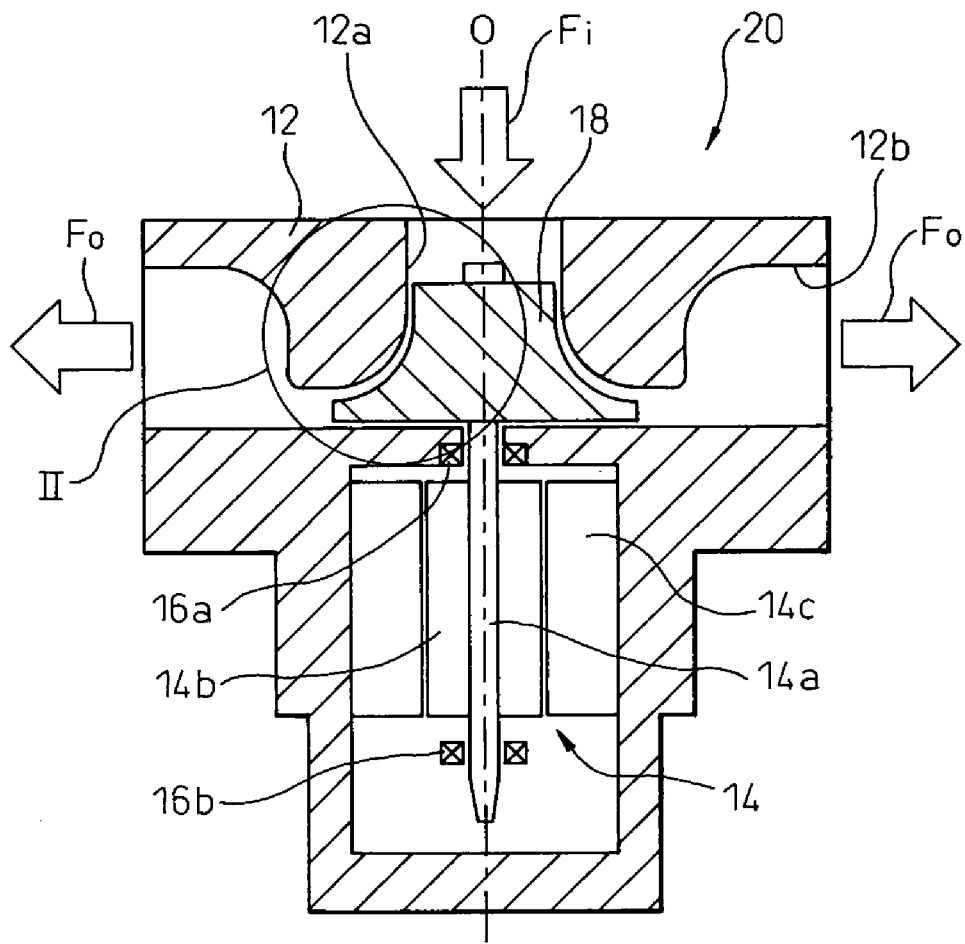
FIG. 2a is a sectional view showing an outline of the entire blower of the second embodiment of the present invention.
Figure 2B:
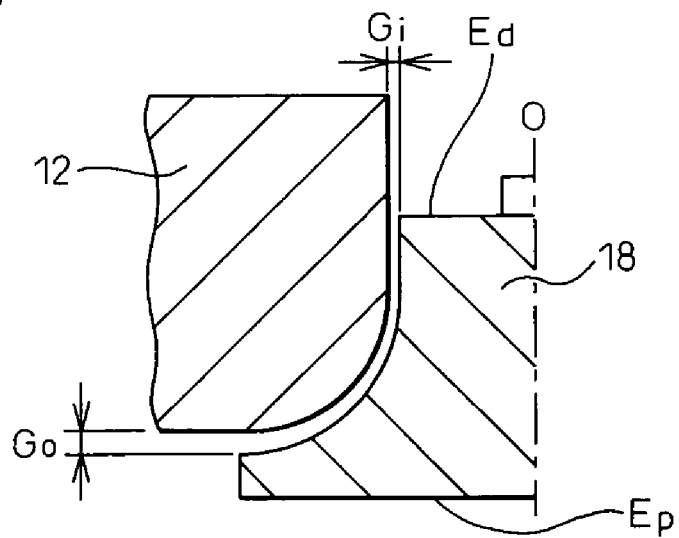

A variation of the present invention is shown in FIGS. 2a and 2b. In this connection, like reference characters are used to indicate like components in FIGS. 1a and 1b and FIGS. 2a and 2b. In the following explanations, the same explanations as those of the embodiment shown in FIGS. 1a and 1b are omitted here.

In the embodiment shown in FIGS. 1a and 1b, the gap $G_o$ formed between the blade 18 and the casing 12, which is located in the neighborhood of the exhaust port 12b, is larger than the gap $G_i$ formed between the blade 18 and the casing 12, which is located in the neighborhood of the suction port 12a. However, the present invention is not limited to the above specific structure. As in the blower 20 shown in FIGS. 2a and 2b, in a portion of the blade 18 where the diameter of the blade 18 is a minimum, a gap formed between the blade 18 and the casing 12 can be made smaller than a gap formed between the blade 18 and the casing 12 in the other portion. That is, in this embodiment, the gap $G_i$ formed between the blade 18 and the casing 12 in the neighborhood of the suction port 12a is formed to be smaller than the gap $G_o$ formed between the blade 18 and the casing 12 in the neighborhood of the exhaust port 12b. According to this embodiment, it is possible to reduce only the gap in the neighborhood of the minimum diameter in which the swing of the blade 18 is the smallest. Therefore, it is possible to improve the blower efficiency without deteriorating the reliability.

The present invention is explained above by referring to a typical embodiment. However, it should be understood that variations may be made, by those skilled in the art, without departing from the scope of the present invention.

The invention claimed is:

1. A blower used for a laser oscillator,
   the laser oscillator comprising:
   an electric discharge tube in which a laser medium of gas is circulated;
   electrodes arranged at the electric discharge tube;
   a pair of reflecting mirrors arranged at both end portions of the electric discharge tube;
   a heat exchanger for cooling the laser medium in the electric discharge tube; and
   a circulating passage through which the laser medium is sucked from the electric discharge tube and introduced into the heat exchanger and the laser medium, which has been cooled by the heat exchanger, is returned to the electric discharge tube, wherein the blower circulates the laser medium between the electric discharge tube and the circulating passage in the laser oscillator, a casing having a suction port and an exhaust port; and a blade pivotally supported in the casing so that the blade can face the suction port and the exhaust port, the blade has an extending part, which extends along an inner surface of the casing in a cross section including the rotary center line, wherein the blade is formed into a shape in which a diameter of the blade is different according to a position on a cross section perpendicular to a rotary center line of the blade, and a gap between the extending part of the blade and the casing in a portion in which the diameter of the blade is relatively large is larger than a gap between the extending part of the blade and the casing in a portion in which the diameter of the blade is relatively small.

2. A blower used for a laser oscillator according to claim 1, wherein a gap between the casing and the extending part of the blade in a portion where the diameter of the blade is a maximum is extended to be larger than a gap in a portion other than the portion where the diameter is a maximum.

3. A blower used for a laser oscillator according to claim 1, wherein a gap between the casing and the extending part of the blade in a portion where the diameter of the blade is a minimum is smaller than a gap in a portion other than the portion where the diameter is a minimum.

* * * * *